United States Patent [19]
Saito et al.

[11] Patent Number: 5,637,977
[45] Date of Patent: Jun. 10, 1997

[54] CONNECTOR ASSEMBLY USED IN SUPPLYING ELECTRICITY TO A RECEIVER

[75] Inventors: Masashi Saito; Shinichi Yamada; Eiji Saijo; Hikaru Itou, all of Yokkaichi; Yasuyoshi Fukao; Toshiyuki Sekimori, both of Toyota, all of Japan

[73] Assignees: Sumitomo Wiring Systems, Ltd.; Toyota Jidosha Kabushiki Kaisha, both of Japan

[21] Appl. No.: 259,189

[22] Filed: Jun. 13, 1994

[30] Foreign Application Priority Data

Jun. 14, 1993 [JP] Japan ................................. 5-168438
Aug. 31, 1993 [JP] Japan ................................. 5-240443

[51] Int. Cl.⁶ .................................................. H01R 13/70
[52] U.S. Cl. .................................................. 320/2; 439/310
[58] Field of Search ................................ 320/2, 5, 43, 48; 200/51 R, 51.09; 439/310

[56] References Cited

U.S. PATENT DOCUMENTS

| | | |
|---|---|---|
| 3,711,816 | 1/1973 | Schumacher . |
| 4,553,000 | 11/1985 | Appleton . |
| 4,952,160 | 8/1990 | Olsen ................................. 439/142 |
| 5,184,058 | 2/1993 | Hesse et al. ........................ 320/43 X |
| 5,350,312 | 9/1994 | Kuno et al. ........................ 439/310 |
| 5,413,493 | 5/1995 | Hoffman ........................... 200/51.09 |
| 5,417,579 | 5/1995 | Yoshioka et al. ................. 439/310 |
| 5,429,524 | 7/1995 | Wakata et al. .................... 439/310 |
| 5,433,623 | 7/1995 | Wakata et al. .................... 439/310 |

FOREIGN PATENT DOCUMENTS

| | | |
|---|---|---|
| 4343209 | 7/1994 | Germany . |
| 4432194 | 4/1995 | Germany . |
| 24539 | 6/1985 | Japan . |
| 124774 | 11/1992 | Japan . |
| 334908 | 11/1992 | Japan . |

OTHER PUBLICATIONS

Copy of application No. 876,262 Busch–Jaeger Ludenscheider (3 pages) May 11, 1953 Germany.

Copy of European Search Report, Nov. 1995. (3 pages).

*Primary Examiner*—Edward Tso
*Attorney, Agent, or Firm*—Jordan B. Bierman; Bierman, Muserlian and Lucas LLP

[57] ABSTRACT

This invention provides a charging apparatus for an electric vehicle which prevents a charging coupling from becoming overheated and melting upon charging. In the charging apparatus, when a lever 33 provided on a supply connector 2 is grasped, the supply connector 2 is completely fitted to a vehicle inlet 1 by a pair of stays 36 connected to the lever 33. A slide switch 42, which serves to open and close a charging circuit in the supply connector 2, is inhibited from being operated by a stopper face on the lever 33 under a normal condition and allowed to be operated when the supply connector 2 is completely fitted to the vehicle inlet 1. When a microswitch 44 associated with the slide switch 42 is turned to ON, a relay 90 in a charger 74 is energized to close the charging circuit, thereby enabling conduction from a power source to a battery.

7 Claims, 9 Drawing Sheets

CONNECTOR ASSEMBLY USED IN SUPPLYING ELECTRICITY TO A RECEIVER

BACKGROUND OF THE INVENTION

1. Field of the Invention

This invention relates to a charging apparatus for an electric vehicle, and more particularly to a charging apparatus for an electric vehicle which can prevent terminals in a charging coupling from becoming overheated and melting.

2. Statement of the Prior Art

Electric vehicles will find increasing use in the near future in view of environment and energy. As such, the problem of battery charging must be overcome. In particular, a coupling for charging raises an important problem. A charging coupling includes a vehicle inlet or a vehicle connector installed in an electric vehicle and a supply connector or a power source connector connected to a power source on the ground. The vehicle inlet and supply connector have supply terminals which conduct a charging current and signal terminals which control the charging current. Charging work is carried out under relatively high voltages of 200 to 500 V and relatively high currents of 80 to 150 A. Accordingly, an arc is prevented from occurring between the supply terminals upon fitting the charging coupling.

It is effective in charging coupling to extend the supply terminals and to shorten the signal terminals so that the signal terminals are contacted with each other after the supply terminals have been contacted with each other and the supply terminals are enabled to conduct a charging current after contacting of the signal terminals upon fitting the coupling and so that the supply terminals are inhibited to conduct the current after separating of the signal terminals upon detaching the coupling. That is, a difference between lengths of the supply terminals and signal terminals causes a difference between mechanical contact times of respective terminals upon fitting and detaching in coupling.

In actual charging work, an operator holds the supply connector and pushes it into or pulls it out from the vehicle inlet. In the case of fitting and detaching the charging coupling there is no problem so long as the supply connector is driven rapidly and straight during insertion and extraction.

However, if the supply connector is not aligned properly, the signal terminals chatter, that is, they repeatedly contact with and separate from each other, at the commencement of contact or when detachment is terminated. Then, since the supply terminals contact each other under a state of incomplete fitting, chattering of the signal terminals cause the charging circuit to open and close so as to conduct and shut off the charging current, thereby overheating and possibly melting the supply terminals.

In order to avoid such a problem, it is possible to prevent chattering by increasing the difference between the lengths of the supply terminals and signal terminals to thereby extend the interval between the contacting and separating times. However, in this case, the coupling will be large in size and inconvenient to handle.

SUMMARY OF THE INVENTION

An object of the present invention is to provide a charging apparatus for an electric vehicle, which can prevent terminals in charging coupling from becoming overheated or melting by commencing conduction to supply terminals after positively fitting the charging coupling upon charging.

In order to achieve the above object, a charging apparatus for an electric vehicle in accordance with the present invention, wherein a battery on the vehicle is charged from a power source on the ground through a coupling including a vehicle inlet installed in the vehicle and a supply connector connected through a cable to said power source, comprises means for enabling said coupling to conduct a current when said supply connector is completely fitted to said vehicle inlet.

Also, for example, said supply connector is provided with a fitting-assist mechanism having an operation lever and a pair of stays which serve to pull said supply connector into said vehicle inlet in connection with grasping of said operation lever to completely fit them. Said enabling means inhibit a switch provided in said fitting-assist mechanism and are adapted to open and close a charging circuit from moving to a position in which said charging circuit is closed under a normal condition and allow said switch to move to said position only upon completely fitting said supply connector to said vehicle inlet.

In addition, the charging apparatus for an electric vehicle further comprises means for controlling a conduction amount in accordance with a charge state of said battery in the vehicle.

Also, a charging apparatus for an electric vehicle wherein a battery on the vehicle is charged from a power source on the ground through a coupling including a vehicle inlet installed in the vehicle and a supply connector connected through a cable to said power source, comprises means for enabling said coupling to conduct a current when said supply connector is completely fitted to said vehicle inlet. Said enabling means are provided with a delay unit which allows conduction after a given time duration from the time when said supply connector is completely fitted to said vehicle inlet.

According to the above construction conduction can be enabled from the supply connector to the vehicle inlet only when the supply connector is completely fitted to the vehicle inlet. That is, since the enabling means do not allow conduction in the case of incomplete fitting, it is possible to avoid conduction under such circumstances as chattering of the signal terminals.

For example, when the lever is grasped after the supply connector has been temporarily fitted to the vehicle inlet upon charging, the stay serves to pull the supply connector into the vehicle inlet. The enabling means inhibits the switch from being closed during temporary fitting, but allows the switch to be closed when proper fitting is realized. Consequently, an operator can close the switch to close the charging circuit and commence charging.

Further, conduction is enabled from the supply connector to the vehicle inlet only when the supply connector is completely fitted to the vehicle inlet. Then, the controlling means controls an amount of conduction in accordance with the charge state of the vehicle battery.

The delay unit enables conduction from the supply connector to the vehicle inlet after passing through the given time duration from the time when the supply connector is completely fitted to the vehicle inlet. That is, the delay unit assures the setting of a given time duration from the time when the coupling is brought into the complete fitting position to the time when the conduction begins.

According to the present invention, since conduction is not enabled so long as the supply connector is not completely fitted to the vehicle inlet, there is no repetition of conduction and shutting of charging currents due to chattering of the signal terminals, thereby preventing the terminals from becoming overheated or melted due to arcs, and simultaneously avoids an increase in size of the charging coupling.

Since an action of grasping the lever is sufficient to realize complete fitting, it is not necessary to add a special means for detaching a complete fitting state.

Also, since a combination of the enabling means and fitting-assist mechanism inhibits and admits operation of the switch, the coupling can enhance its reliability.

In addition, since the conduction amount can be controlled in accordance with the charge state of the vehicle battery, it is possible to prevent overcharging.

Since conduction is enabled after a given time period from the time when the supply connector is completely fitted to the vehicle inlet, even if there is any dispersion between the period of time in the complete fitting condition and the period of time in the conduction-enabling condition, the conduction can be effected while compensating such dispersion.

BRIEF DESCRIPTION OF THE DRAWINGS

FIG. 3 is a longitudinal sectional view of the coupling shown in FIG. 2, illustrating a position in which a slide switch is turned to ON;

DETAILED DESCRIPTION OF THE PREFERRED EMBODIMENTS

Figure 1:
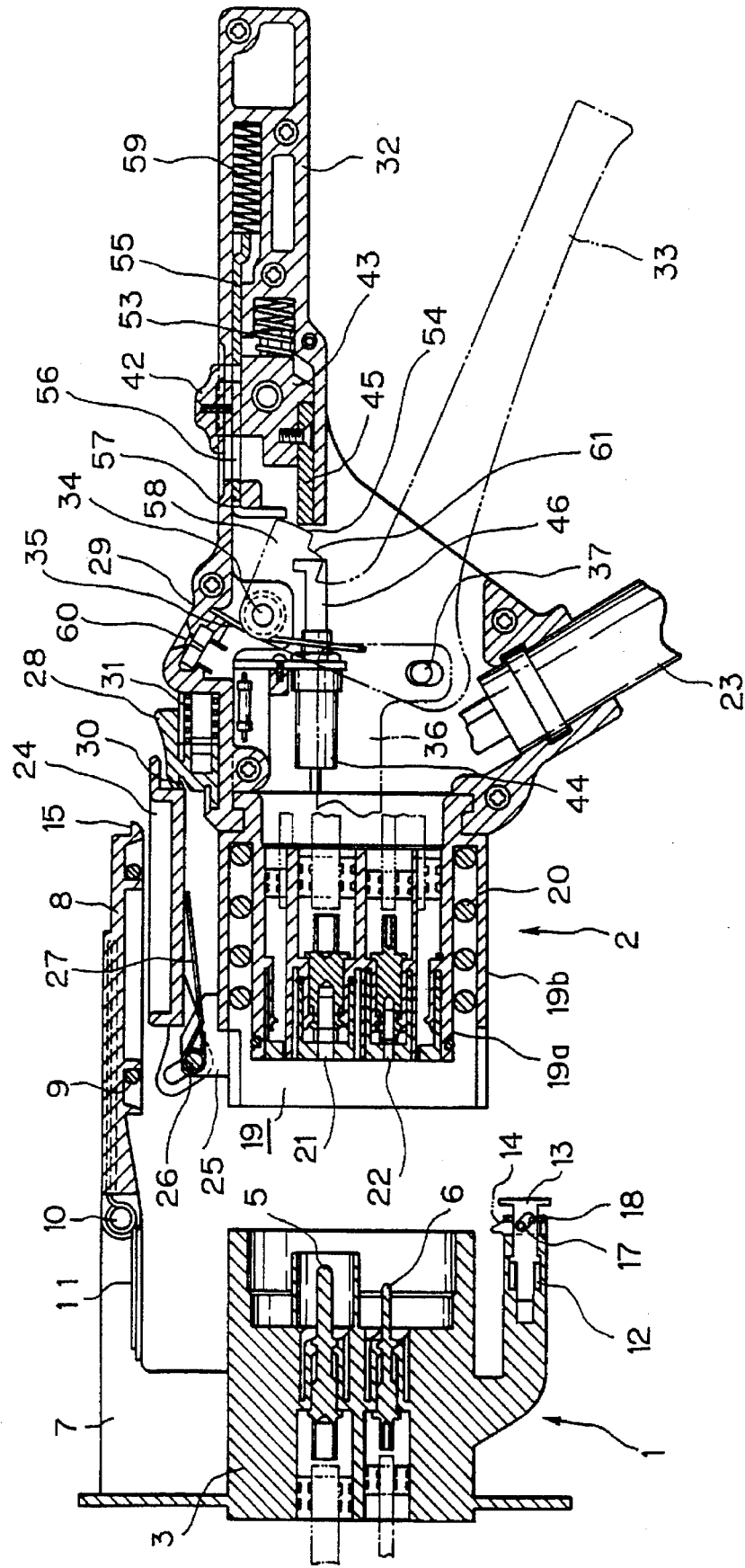
FIG. 1 is a longitudinal sectional view of a charging coupling in accordance with the present invention, illustrating a position prior to be fitted.

Embodiments of a charging apparatus for an electric vehicle in accordance with the present invention will be explained below by referring to the drawings.

First, a charging coupling for a charging circuit of an electric vehicle will be described. The charging coupling includes a vehicle connector or inlet 1 and a power source connector or supply connector 2. The vehicle inlet 1 is provided with a cylindrical inlet housing 3 which accommodates male charging terminals 5 connected to a battery 4 in a vehicle, male signal terminals 6 for detecting a charging condition, and a male earth terminal not shown. The male charging terminals 5 and male earth terminal are set to be longer than the male signal terminals 6 so that the male signal terminals 6 are connected to female signal terminals 22 described hereinafter after the male charging terminals 5 are connected to female charging terminal 21 described hereinafter.

The inlet housing 3 is provided on a bracket 7 on a top face with a spring-back flap 8, which detachably covers an opening of the inlet housing 3 and seals an interior of the housing 3 by a seal ring 9 mounted on an inner face of the flap 8. A torsion spring 11 is mounted on a supply axle 10 to bias the spring-back flap 8 toward an opened position. However, the flap 8 is provided with a stopper (not shown) which limits an angular displacement of the flap 8 at an angle perpendicular to the inlet housing 3.

On the other hand, the spring-back flap 8 is provided on a lower portion with a lock mechanism which holds the flap 8 in a closed position. The lock mechanism includes an operation rod 13, a compression coil spring 12, and a stopper pin 14 disposed perpendicularly to the rod. The lock mechanism detachably receives a pawl 15 provided on the spring-back lap 8. The stopper pin 14 is fitted in a vertical groove (not shown) formed in the operation rod 13 so that a boss 17 on an outer face of the stopper rod 14 is associated with a cam groove 18 extending through the operation rod 13. When the operation rod 13 is pushed, the cam groove 18 moves the stopper up and down by its guide action.

The supply connector 2 is provided with a double cylindrical housing 19 including an inner housing 19a and an outer housing 19b. A compression coil spring 20 is disposed in a gap between the inner and outer housings 19a and 19b so that an outer end of the spring 20 detachably contacts with an opening edge on the vehicle inlet 1 to assist a separating action of the inlet 1 and connector 2. The inner housing 19a is provided in its interior with female charging terminals 21, female signal terminals 22, and a female earth terminal (not shown), which are corresponding to the male charging terminals 5, male signal terminals 6, and male earth terminal (not shown) of the vehicle inlet 1. The terminals 21, 22 and earth terminals are connected through a cable 23 to a power source on the ground. In the present embodiment, there are provided in the inner housing 19a with two female charging terminals 21, two female signal terminals 22, and a single female earth terminal (not shown), that is, five-pole terminal construction.

The outer housing 19b is provided on a top face with a spring-back flap 24 which detachably covers an opening of the outer housing 19b. The flap 24 is rotatably supported on a support pin 26 received in a bearing portion 25 formed on the top face of the outer housing 19b. A torsion spring 27 is mounted on the support pin 26 to bias the spring-back flap 24 toward a returned direction (a direction of closing the opening of the housing 19). A lock piece 28 is formed on a top face of a body 29 connected to a rear portion of the housing 19 to hold the spring-back flap 24 in an opened position. The lock piece 28 detachably engages with an edge 30 of the flap 24 at the distal end thereof and slides on the body 29 forwardly and rearwardly. Further, the lock piece 28 mounts a spring 31 on its rear portion so that the lock piece 28 is biased toward a direction of engaging with the spring-back flap 24 by the spring 31.

The body 29 is provided on its rear portion with a grip shaft 32 which extends axially and is adapted to fit the housing 19 to the inlet housing 3 of the vehicle inlet 1. An operation lever 33 is rotatably attached to a proximal end of the grip shaft 32 through a rotary axle 34 to assist the supply connector 2 to be fitted to the vehicle inlet 1. A torsion spring 35 is mounted on the rotary axle 34 to bias the lever 33 to an opened position. A pair of stays 36 are coupled to the lever 33. A fitting-assist mechanism is constituted by the lever 33 and stays 36. The lever 33 is formed into an L-shaped body. The stays are coupled through a coupling pin 37 to a bent portion of the lever 33.

Figure 5A:
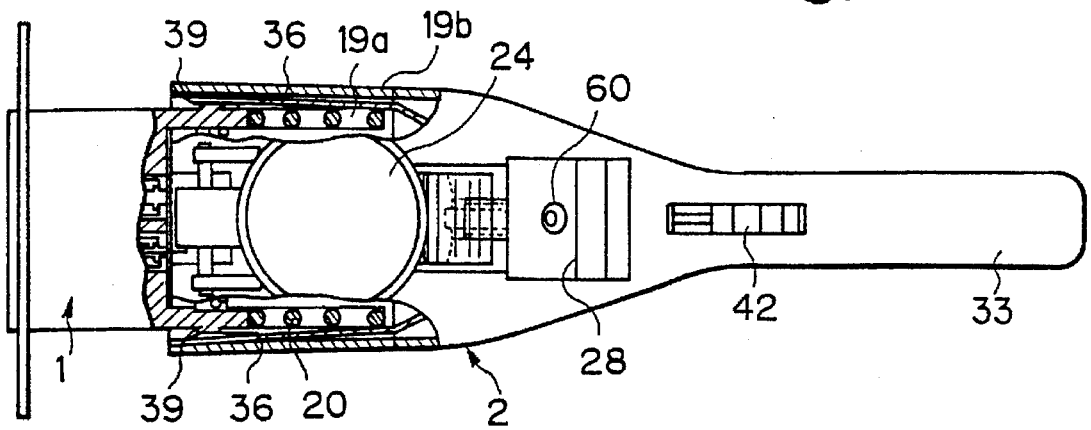
FIGS. 5A to 5C are partially broken away plan views of the charging coupling in accordance with the present invention, illustrating a normal position (5A) of a stay, a deformed position (5B) of the stay, and a retracted position (5C) of the stay.
Figure 5B:
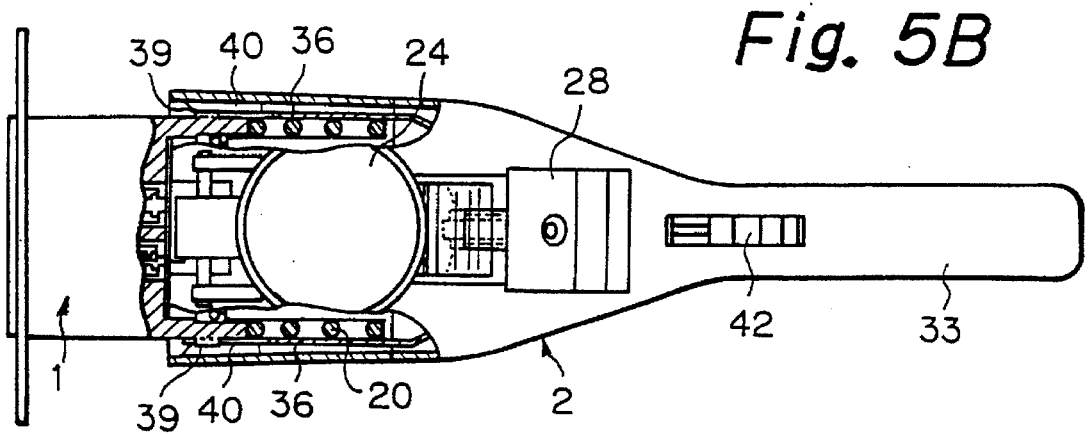
Figure 5C:
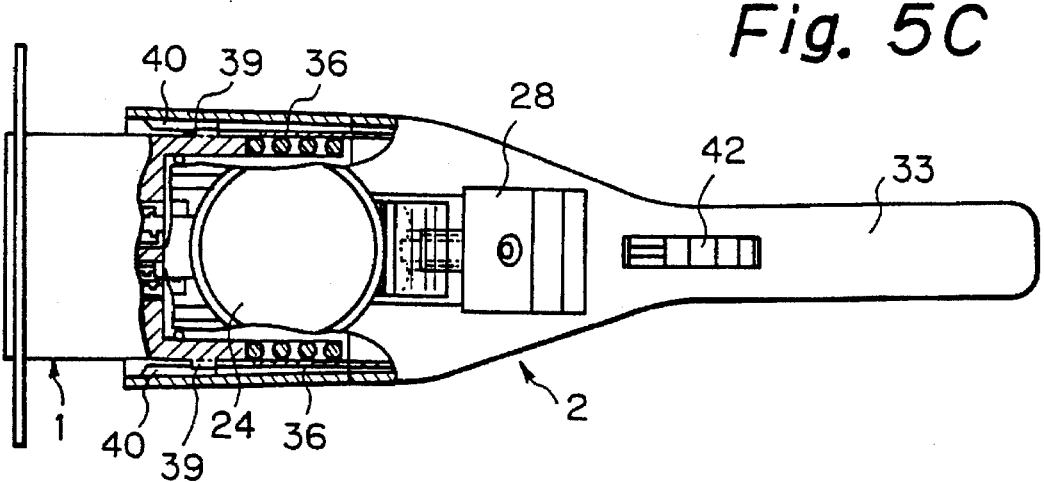
Figure 7A:
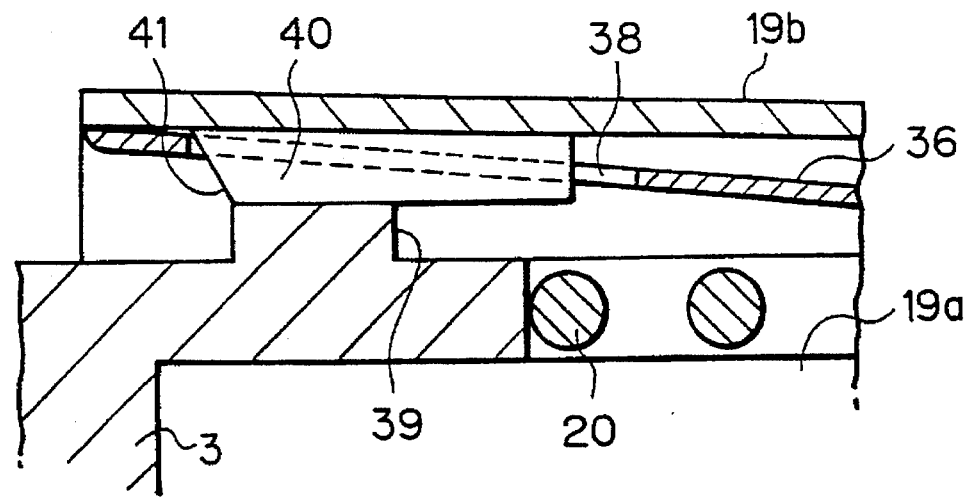
FIGS. 7A and 7B are enlarged fragmentary longitudinal sectional views of a guide projection, illustrating a widened position (7A) and a narrowed position (7B)
Figure 7B:
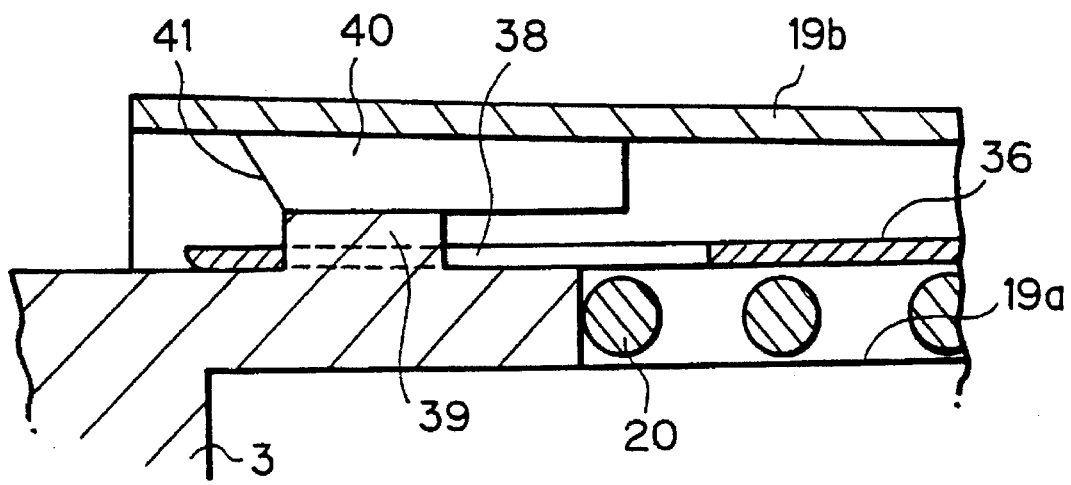

As shown in FIGS. 5A to 5C, each stay 36 is inserted into right and left sides in a gap between the inner housing 19a and the outer housing 19b. The stay 36 is provided on its distal end with an elongated slot 38 which receives each of bosses 39 projected on an outer face of the inlet housing 3 of the vehicle inlet 1 (see FIG. 7). Further, in order that the stays 36 do not interfere with the bosses 39 upon fitting the supply connector 2 to the vehicle inlet 1, a distance between the distal end of the stays 36 is widened under a normal condition as shown in FIG. 5A so that the slots 38 receive guide projections 40 formed on an inner wall of the outer housing 19b (see FIG. 7). However, when the stays 36 are retracted by grasping the lever 33, the distal ends of the stays 36 are narrowed so that an end of the slot 38 engages with a ramp 41 of the guide projection 40, thereby closely contacting the stays 36 with the outer face of the vehicle inlet 1.

When the supply connector 2 is fitted to the vehicle inlet 1 by a given length (incomplete fitting) to hold a temporary position of the connector 2, the slots 38 in the stays 36 receive the bosses 39 on the vehicle inlet 1. In this embodiment, the supply connector 2 is fitted in the incomplete fitting position to the vehicle inlet and maintained temporarily.

Figure 3:
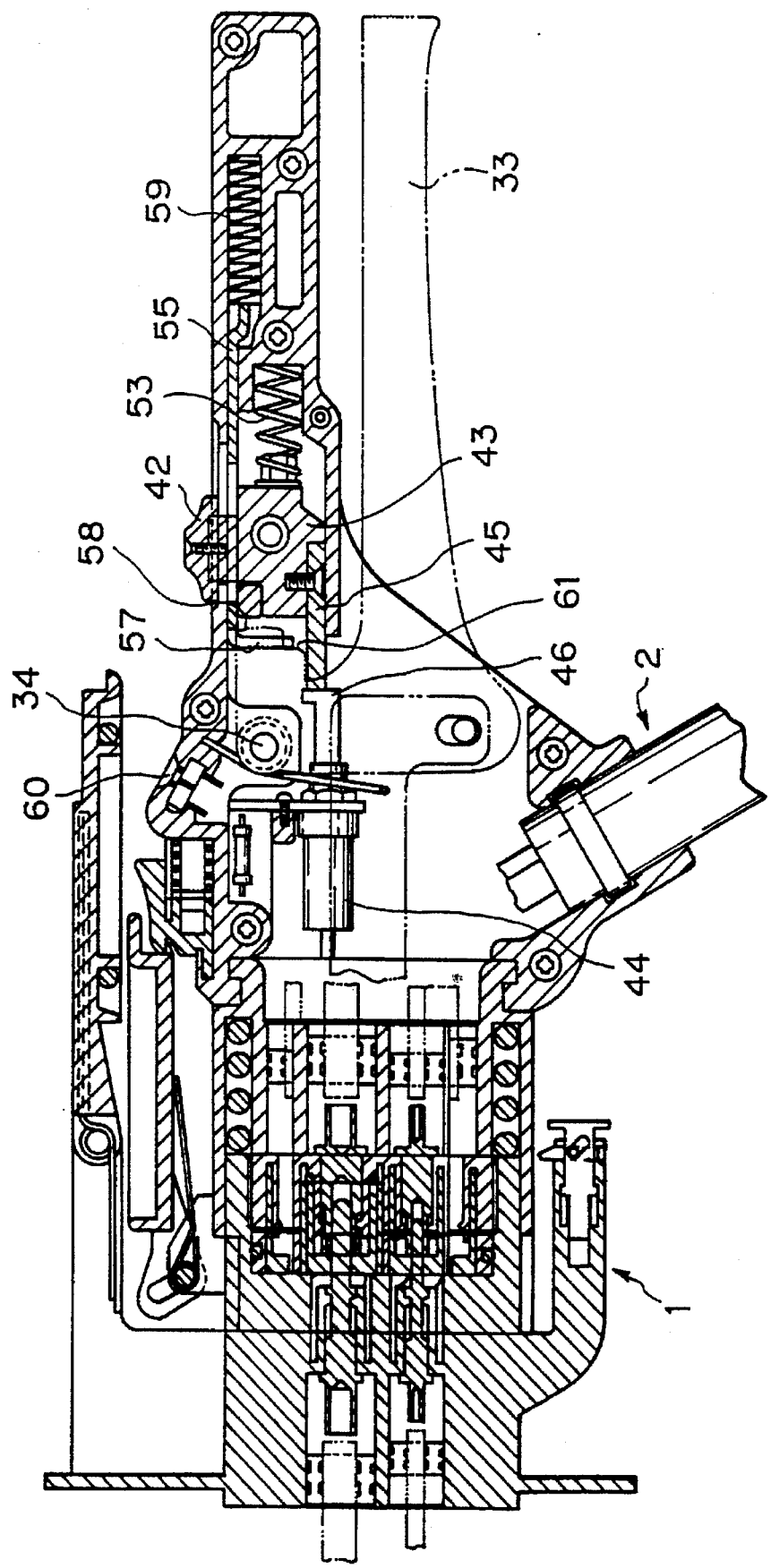
Figure 8:
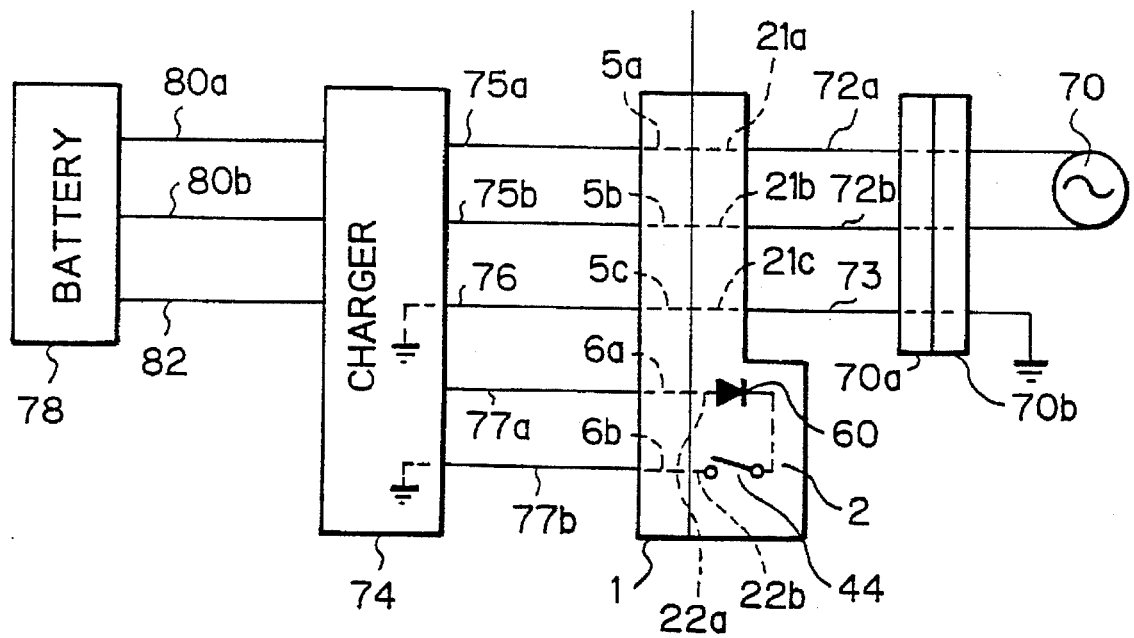
FIG. 8 is a circuit diagram illustrating a charging circuit of a charging apparatus in accordance with the present invention.

The grip shaft 32 is provided on an upper face with a slide switch 42 which opens and closes a charging circuit described hereinafter by referring to FIG. 8. The slide switch 42 has a slide block 43 disposed in the grip shaft 32 and a push plate 45 secured to a bottom of the block 43 and extending toward a microswitch 44 which constitutes a part of the charging circuit. When the slide switch 42 is driven to ON position (see FIGS. 3 and 6B), the push plate 45 pushes a contact 46 of the microswitch 44.

Figure 4:
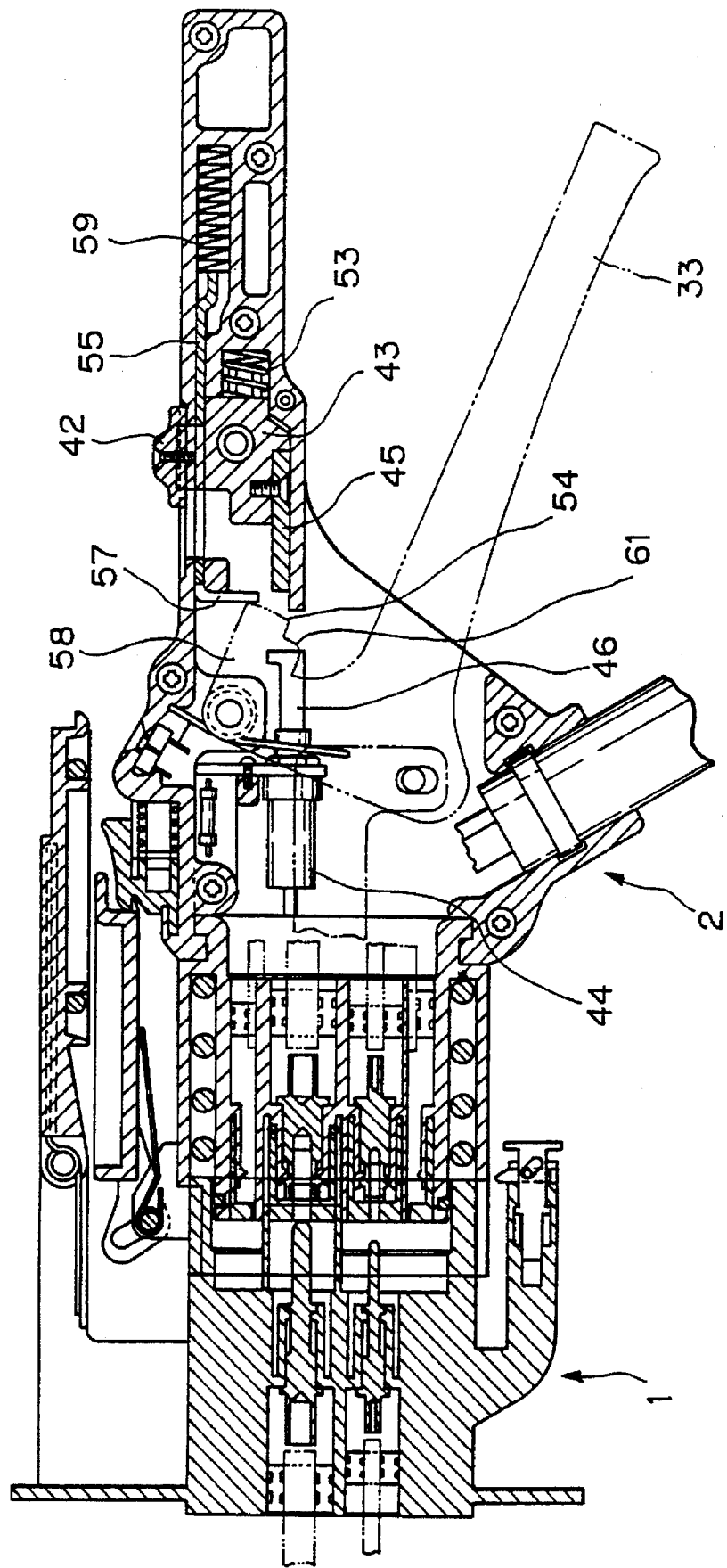
FIG. 4 is a longitudinal sectional view of the coupling shown in FIG. 3, illustrating a position in which the slide switch is returned.
Figure 6A:
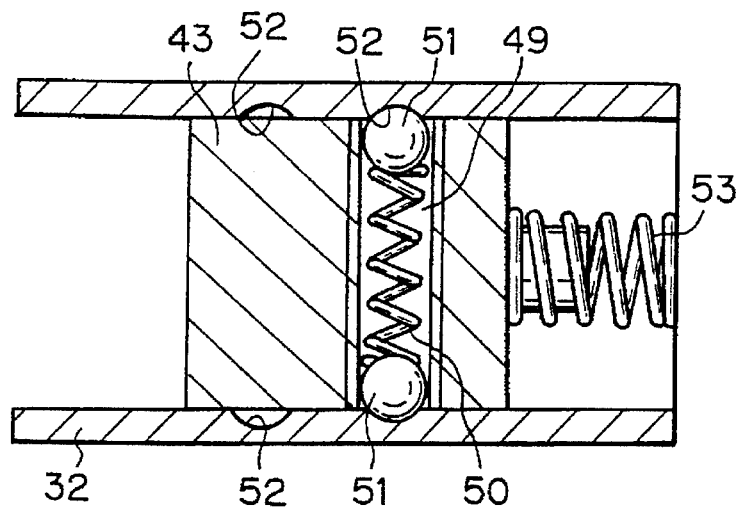
FIGS. 6A to 6C are longitudinal sectional views of the slide switch, illustrating an OFF position (6A), an ON position (6B), and a returned position (6C)
Figure 6B:
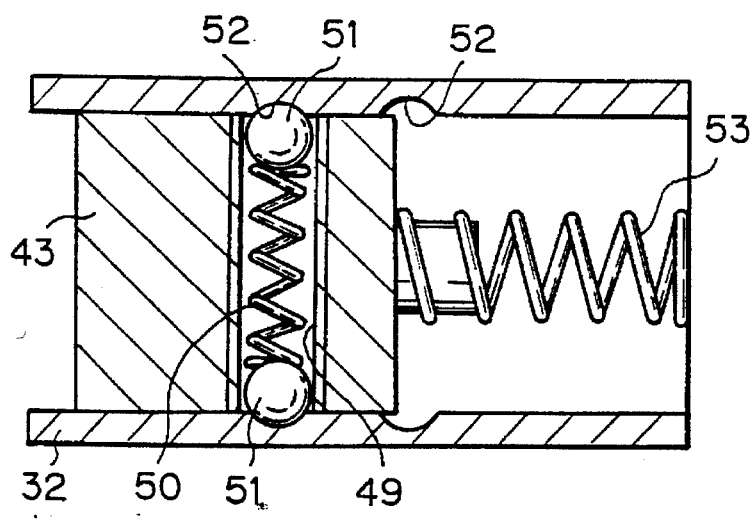
Figure 6C:
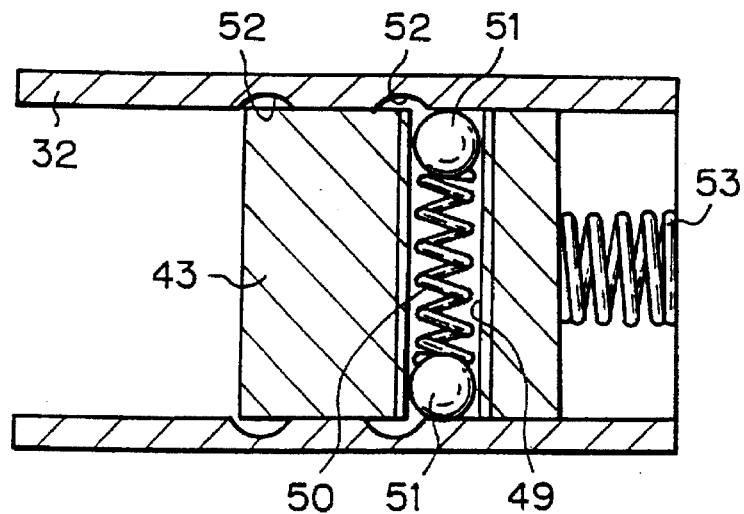

In this embodiment, the slide switch 42 can be disposed at three positions such as ON position (FIGS. 3 and 6B), OFF position (FIGS. 1, 2 and 6A), and returned position (FIGS. 4 and 6C). The slide switch is maintained at the ON and OFF positions by the following manner. As shown in FIGS. 6A to 6C, the slide block 43 of the slide switch 42 is provided with a hole 49 extending diametrically. A compression coil spring 50 is accommodated in the hole 49 and balls 51 are disposed at the opposite ends of the spring 50 to elastically push the inner wall of the grip shaft 32.

On the other hand, the grip shaft 32 is provided on its inner wall with recesses 52, which are arranged at positions corresponding to the ON and OFF positions. When the balls 51 engage with the respective recesses 52, the slide switch 42 is maintained at the ON and OFF positions. Further, a compression coil spring 53 is disposed between a rear side of the slide block 43 and a support wall in the grip shaft 32 to bias the slide witch 42 from the returned position to the OFF position. However, since a spring force which pushes the balls 51 to the recesses 52 by the spring 50 is set to be stronger than that of the spring 53, the slide switch 53 cannot be displaced from the OFF position to the ON position only by the spring 53. If the operation applies a force more than a given force to the slide switch 42, the balls are released from the recess 52.

The slide switch 42 can not be driven to the ON position so long as the supply connector 2 is not completely set to the vehicle inlet 1 (the complete fitting position). A first stopper face 54 is defined by an edge of an end portion of the lever 33 in the vicinity of the rotary axle 34 and in opposition to an end of the push plate 45 of the slide switch 42. The slide switch 42 is inhibited from being actuated to the ON position before the lever 33 reaches the predetermined angular position.

The grip shaft 32 is provided in its interior with a lever-lock plate 55 which extends axially and serves to maintain the lever 33 at the closed position. The lever-lock plate 55 is provided in its middle portion with an escape slot 56 which enables the slide block 43 to displace in the grip shaft 32 and on its end portion with a downward bent portion. The downward bent portion of the plate 55 is provided with an aperture 57 which receives and holds a part of the lever 33. The lever 33 is provided below the first stopper face 54 with a stepped portion. An edge portion 58 having the first stopper face 54 is detachably engaged with the aperture 57. The lever 33 is provided below the edge portion 58 with a stepped stopper face 61 which constrains the push plate 45 from advancing unless the lever 33 is moved to the complete fitting position.

On the other hand, a compression coil spring 59 pushes a rear end of the lever-lock plate 55 to bias the plate 55 forwardly. The lever-lock plate 55 abuts on the first stopper face 55 under a normal condition to be constrained from advancing, as shown in FIG. 1 when the lever 33 is grasped to the complete fitting position so that the first stopper face 54 is opposite to the aperture 57, the edge portion 58 is inserted into the aperture 57 to hold the lever at the grasped position. Thus, the lever 33 is locked at the complete fitting position. When the slide switch 42 is retracted from the OFF position to the returned position, the edge portion 58 comes out from the aperture 57 to return the supply connector 2 to the temporary fitting position. That is, unless the slide switch 42 is returned to the returned position, the supply connector 2 is locked at the complete fitting position relative to the vehicle inlet 1.

Thus, a double lock mechanism is constituted by the lever-lock plate 55 and the push plate 45 associated with the slide switch 42. A lamp 60 made of an LED is lit when the charging circuit is turned to ON.

The charging circuit will be explained by referring to FIG. 8. The supply connector 2 is connected through a pair of plug sockets 70a and 70b to a home power source 70 (AC 200 V, 1 PH (single-phase)). The supply connector 2 is connected through two power supply cables 72a and 72b and a single earth cable 73 to the plug socket 70a. The supply connector 2 is connected to the vehicle inlet 1 through the female charging terminals 21a and 21b and the male charging terminals 5a and 5b; the female earth terminals 21c and the male earth terminals 5c; and the female signal terminals 22a and 22b and the male signal terminals 6a and 6b. The microswitch 44 and lamp 60 made of the LED, described above, are connected in series between the female signal terminals 22a and 22b.

On the other hand, the vehicle inlet 1 is connected through a charger 74 installed in the vehicle to a battery 78 installed in the vehicle. The charger 74 is connected to the male charging terminals 5a and 5b through charger power supply cables 75a and 75b; to the male earth terminal 5c through charger earth cable 76; and to the male signal terminals 6a and 6b through charger signal cables 77a and 77b. Further, the vehicle charger 74 is connected to the vehicle battery 78 through battery power supply cables 80a and 80b which conduct a charging current from the charger 74 to the battery 78 and through a battery signal cable 82 which transmits a detecting signal indicating of the charged condition in the battery 78 to the charger 74.

Figure 9:
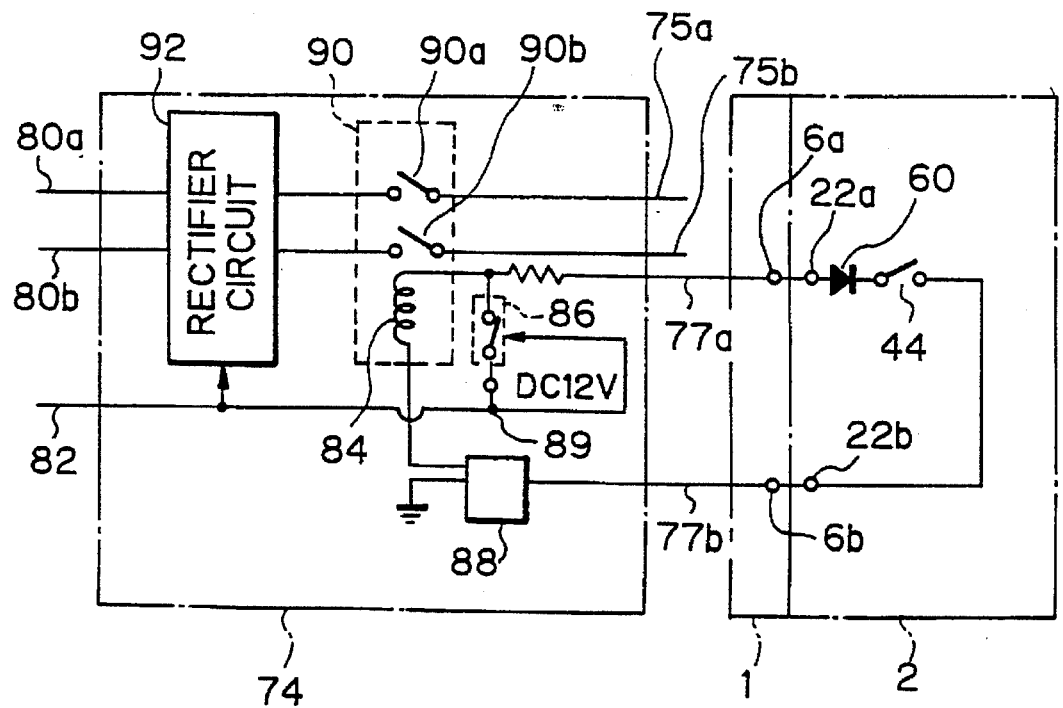
FIG. 9 is a circuit diagram illustrating a charger shown in FIG. 8.

FIG. 9 shows an arrangement of the vehicle charger 74. A relay coil 84 of a relay 90 is connected in series to a timer circuit 88. An end of the relay coil 84 is connected to a DC power source (12 V) 89 through a normal closed switch 84 which opens and closes in response to the battery signal while the other end of the relay coil 84 is connected to earth through the timer circuit 88. The lamp 60 and microswitch 44 are connected in parallel to the relay coil 84 and timer circuit 88 through the charger signal cables 77a and 77b. The lamp 60 is connected to the DC power source (12 V) 89 while the microswitch 44 is connected to earth through the timer circuit 88. The charger cables 75a and 75b are connected through relay contacts 90a and 90b of the relay 90 to a rectifier circuit 92 which converts an AC to a DC and transforms a voltage. The battery power supply cables 80a and 80b are connected to outputs of the rectifier circuit 92.

When the slide switch 42 is driven to the ON position (FIGS. 3 and 6B) to turn the microswitch 44 to ON, the charger 74 flows a signal current from the DC power source (12 V) 89 through the microswitch 44 to the timer circuit 88. The timer circuit 88 is grounded by the signal current after passing a predetermined time period. An energizing current is flown from the DC power source (12 V) 89 through the relay coil 84 to energize the relay and to close the relay contacts 90a and 90b. Consequently, a current from the home power source 70 is rectified and transformed to supply a charging current to the vehicle battery 78. Thus, the charging current from the home power source 70 is enabled to be supplied to the vehicle battery 78 only when the microswitch 44 is turned to ON. On the contrary, if the microswitch 44 is OFF, the timer circuit 88 is not grounded since no signal current flows and the relay 90 is opened since no energizing current flows in the relay coil 84. Accordingly, the charging current is inhibited to be conducted.

An operation and effects of this embodiment will be explained below. First, when the operation rod 13 is pushed the boss 17 is displaced along the cam groove 18 to lower the stopper pin 14. Then, the stopper pin 14 release the pawl 15 of the spring-back flap 8, the flap 8 is leaped up by the torsion spring 11 to be maintained at the opened position. On the other hand, the spring-back flap 24 of the supply connector 2 is turned up to the opened position against the torsion spring 27 and the lock piece 28 is driven to engage with the edge 30 of the flap 24, thereby maintaining the flap 24 at the opened position.

The operator holds the grip shaft 32, directs the inner housing 19a of the supply connector 2 to the inlet housing 3 of the vehicle inlet 1, and pushes the inner housing 19a into the inlet housing 3 by a suitable depth (incomplete fitting position). In this position, the supply connector 2 is temporarily supported in the vehicle inlet 1. At this time, since the stays 36 widen their distal ends as shown in FIG. 5A, the stays 36 do not interfere with the projections on the vehicle inlet 1.

Next, when the operator grasps the lever 33 to retract the stays 36, the end of the elongated slot 38 engages with the ramp 41 of the guide projection 40 and the stays 36 are gradually deflected inwardly to receive the bosses 39 in the slots 38. If the operator continues to grasp the lever 33, the stays 36 are further retracted to exert a pulling force to the vehicle inlet 1. The supply connector 2 is pulled by a reaction of the vehicle inlet 1, thereby bringing the vehicle inlet 1 and supply connector 2 into the complete fitting position.

While the complete fitting position is achieved in the charging coupling, as shown in FIG. 1, the slide switch 42 causes the balls 51 to be fitted in the recesses 52 and the push plate 45 to abuts on the first stopper face 54 of the lever 33, thereby inhibiting the slide switch 42 from being driven to the ON position and avoiding miss-conduction. Similarly, the lever-lock plate 55 abuts on the first stopper face 54 at its distal end to be constrained from advancing.

In this condition, the contact 46 of the microswitch 44 is not pushed in because the slide switch 42 is not driven to the ON position and the energizing current does not flow in the relay coil 84 because the signal current does not flow in the timer circuit 88 through the microswitch 44 from the DC power source (12 V) 89, as shown in FIG. 9. Accordingly, the relay contacts 90a and 90b of the relay 90 are left to be open, thereby inhibiting conduction of the charging current.

Figure 2:
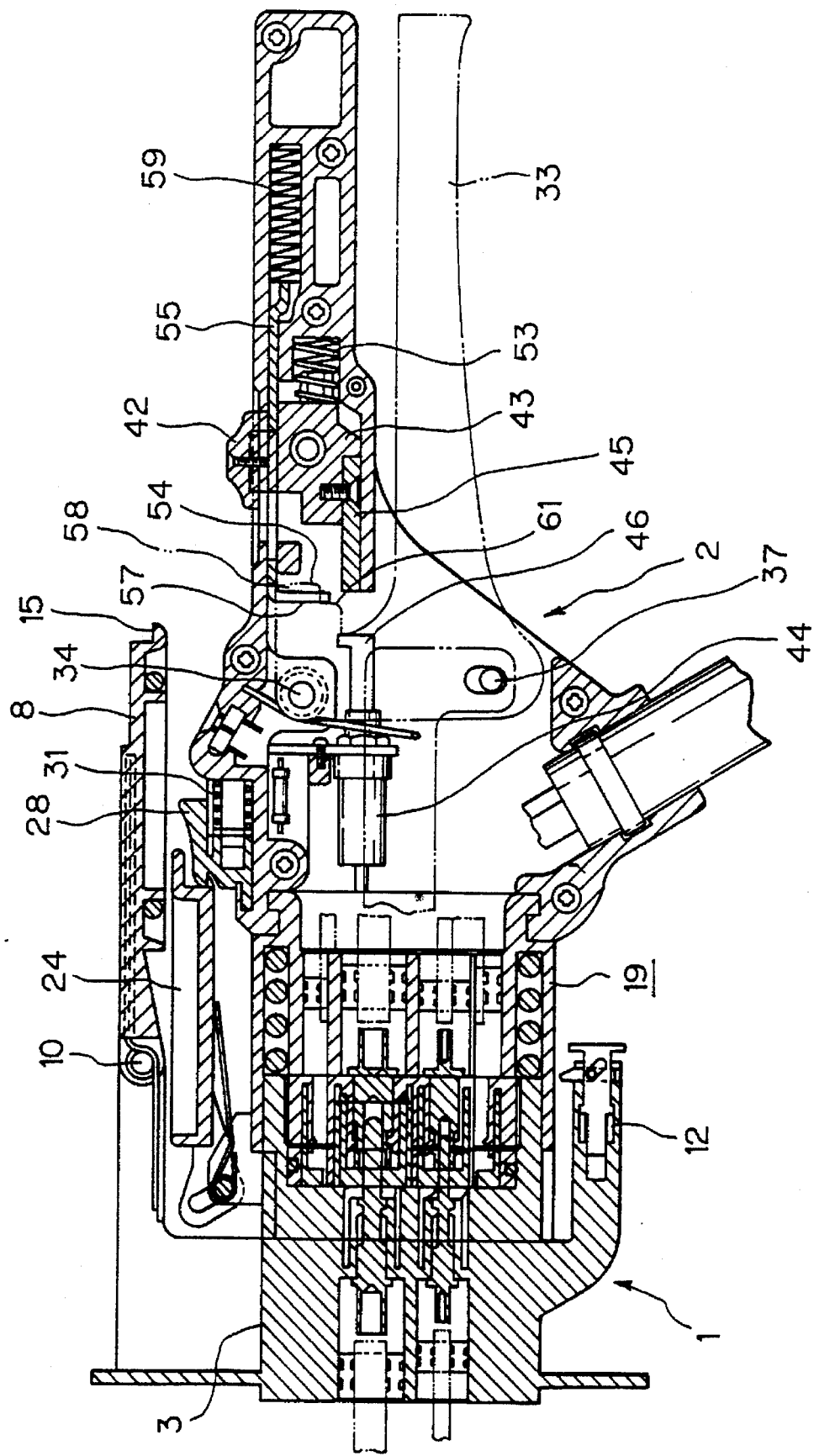
FIG. 2 is a longitudinal sectional view of the coupling shown in FIG. 1, illustrating a position of being completely fitted.

Since the aperture 57 of the lever-lock plate 55 is adapted to receive the edge portion 58 the lever 33 when the coupling reaches the complete fitting position, as shown in FIG. 2, the lever-lock plate 55 is advanced by the spring 59 and the edge portion 58 enters into the aperture 57. Thus, since the lever 33 is maintained in the grasped position the operator is released from continuing to grasp the lever 33.

When the lever 33 reaches the complete fitting position, the second stopper face 61 is displaced to a higher position enough to enable the push plate 45 to advance. If the slide switch 42 is driven from the OFF position to the ON position, the balls 51 are fitted in the recesses 52 in the ON position to maintain the slide switch 42 at the ON position.

The slide switch 42 may be driven from the OFF position to the ON position (from the position shown in FIG. 1 to the position shown in FIG. 3) in connection with the lever 33 by increasing the biasing force of the spring 53 and turning the lever 33 to the complete fitting position. In this case, there is no need for a positioning mechanism including the spring 50, balls 51, and recesses 52.

When the slide switch 42 is driven to the ON position, the push plate 45 pushes the contact 46 of the microswitch 44 (see FIG. 3) and the signal current flows in the timer circuit 88 through the microswitch 44 from the DC power source (12 V) 89 shown in FIG. 9. An end of the relay coil 84 is grounded by the timer circuit 88 after counting times (for example, several seconds) by the timer circuit 88. The energizing current from the DC power source (12 V) 89 flows in the relay coil 84 to energize the relay 90 and to close the relay contacts 90a and 90b. Thus, an alternating current from the home power source 70 is applied to the rectifier circuit 92 of the charger 74, rectified to a direct current and transformed, and then charged in the vehicle battery 78. The signal current flows in the timer circuit 88 from the DC power source (12 V) 89 through the lamp 60 and microswitch 44 and lights the lamp 60 to indicate a condition under charging.

A value of the charging current which is conducted from the charger 74 to the battery 78 is determined in the rectifier circuit 92 in accordance with the battery signal. When charging in the battery has finished, the normal open switch 86 is opened in accordance with the battery signal and the DC power source (12 V) 89 is disconnected from the relay coil 84 and lamp 60. Thus, the relay 90 becomes a deenergizing state since no energizing current flows in the relay coil 84 and the relay contacts 90a and 90b are opened. Consequently, the charging current is shut off even if the contact 46 of the microswitch 44 is pushed in. Also, the lamp 60 is put out lights to indicate finishing of the charging since the signal current from the DC power source (12 V) 89 does not flow in the lamp 60.

When the charging is finished, the microswitch 42 is retracted to the returned position (see FIG. 4). Then, the push plate 45 separates from the microswitch 44. As shown in FIG. 9, since the microswitch 44 opens the circuit, the signal current is shut off from the DC power source (12 V) 89 to the timer 88 to put the lamp 60 out lights. The timer circuit 88 releases the relay coil 84 from the earth not to conduct the charging current from the DC power source (12 V) 89. Then, the relay 90 realizes the deenergizing state and the relay contacts 90a and 90b are opened to inhibit the conduction of the charging current.

As shown in FIG. 4, when the slide switch 42 is retracted to the returned position, the lever-lock plate is retracted against the spring 59. The edge portion 58 of the lever 33 comes out from the slot 57 and the lever 33 is automatically returned by the torsion spring 35. If the stays 36 advance while extracting the supply connector 2, the stays 36 return in reversed order. When the stays 36 separate from the vehicle inlet 1, the supply connector 2 is completely extracted from the vehicle inlet 1.

After the terminals of the inlet 1 and connector 2 are completely interconnected (in the complete fitting position) in this embodiment, the conduction of charging current is enabled, thereby assuring a safe operation. That is, in the case of insertion and extraction of the supply connector 2 from the vehicle inlet 1, no arc is generated between the power supply terminals and heating and melting of the terminals can be prevented, even if the chattering occurs in the signal terminals, since the conduction of charging current is surely shut off.

Since the lever 33 is maintained at the grasped position by the lever-lock plate 55, it is possible to avoid a trouble of displacing the terminals after starting the conduction and carry out a safety charging.

In addition, since the lamp 60 lights during conduction of charging current, it is possible for the operator to recognize a charging operation.

In this embodiment, if the operator wishes to extract the supply connector 2 from the vehicle inlet 1 during charging, by driving the slide switch 42 to the returned position, the microswitch 44 opens the circuit to preclude the signal current from flowing from the DC power source (12 V) 89 to the timer circuit 88, the energizing current is not supplied to the relay coil 84, the relay 90 realizes a deenergized state, and the conduction of charging current is shut off. Consequently, even if the supply connector 2 is extracted from the vehicle inlet 1 during charging it is possible to prevent the arc from occurring between the terminals of the inlet 1 and connector 2 and avoid melting of the terminals.

Further, since the conduction of charging current is enabled after counting the predetermined times by the timer circuit from the time when the contact 46 of the microswitch 44 has been pushed in, the conduction is enabled after the given time period from the time of completely fitting the coupling, thereby enhancing the reliability of the coupling. Since the complete fitting position can be achieved by a fitting-assist action of the lever 33, the coupling is easy to handle.

The present invention may be altered in various forms. Although the lever 33 is provided with the stopper faces in this embodiment, they may be formed on another part so long as the stopper face inhibits the slide switch from being driven to the ON position under a normal condition and enables the driving of the switch upon detecting the complete fitting condition.

Figure 10:
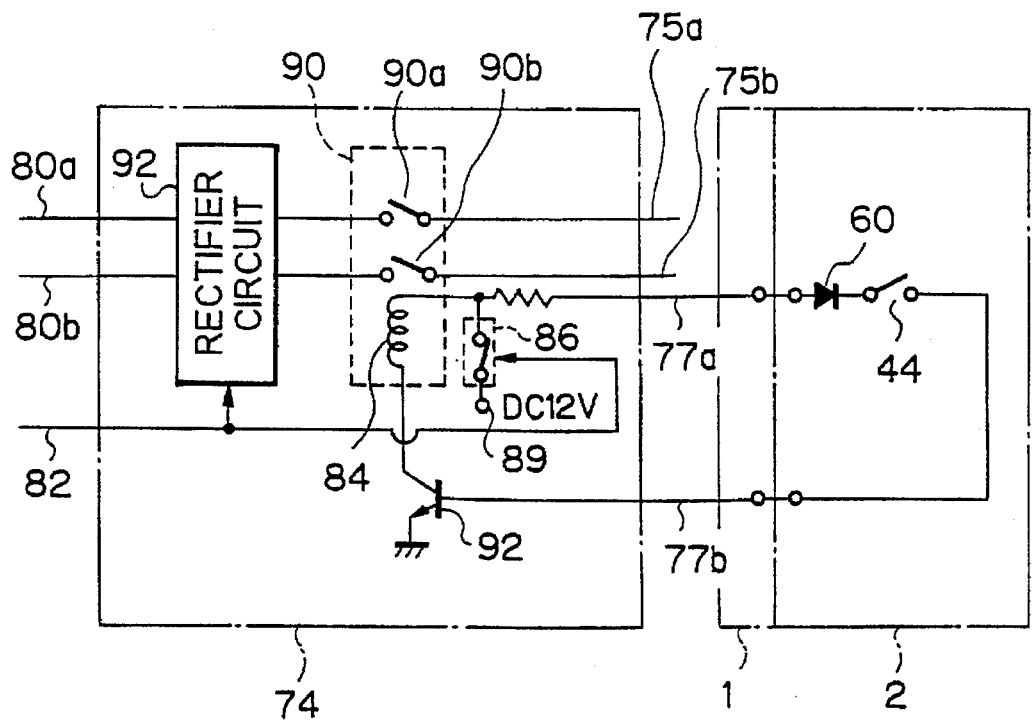
FIG. 10 is a circuit diagram illustrating an alternation of the charger shown in FIG. 9.

Although the charger 74 is provided with the timer circuit 88 in order to delay a timing of starting the conduction of the energizing current, the charger 74 may be altered to, for example an arrangement shown in FIG. 10. A switching element 92 may be used in lieu of the timer circuit 88. The energizing current may be conducted from the DC power source (12 V) 89 to the relay coil 84 in accordance with the signal current as soon as the contact of the microswitch is pushed in. Since the contact 46 of the microswitch 44 is pushed in after the complete fitting position is achieved, such altered construction enables conduction of a charging current after a complete fit is realized.

Figure 11:
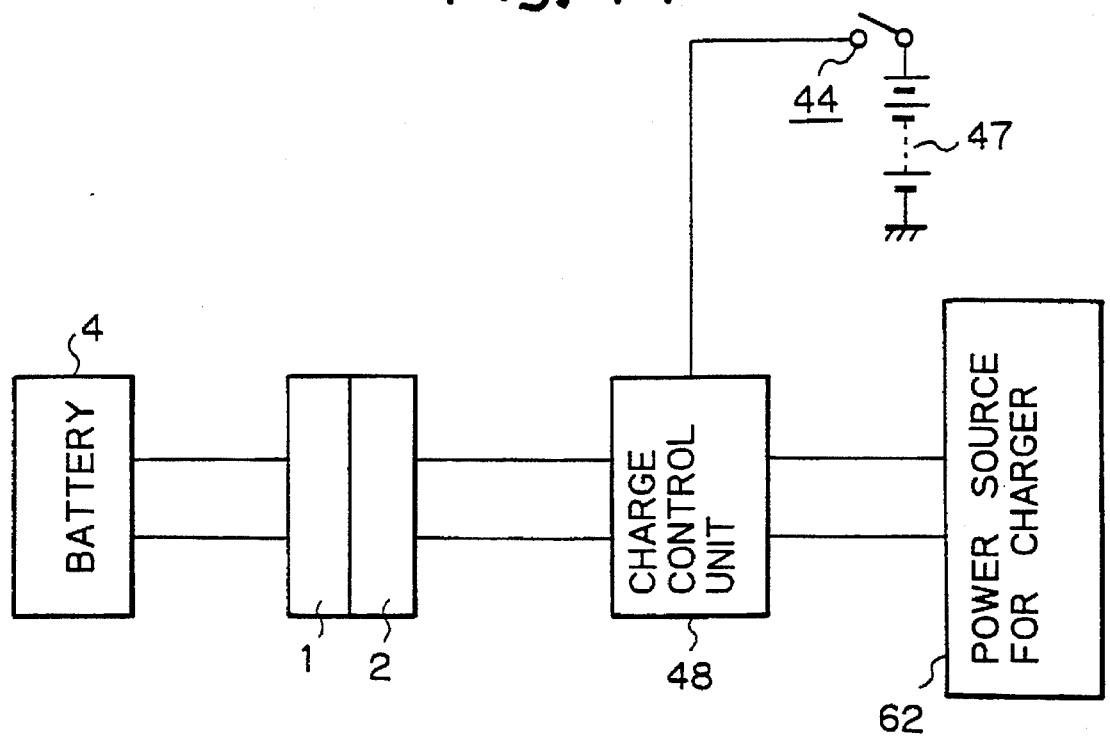
FIG. 11 is a block diagram illustrating an alternation of the charging circuit shown in FIG. 8.

In the embodiment, although the home power source charges the vehicle battery through the vehicle charger, the present invention is not limited to this embodiment. For example, a special DC power source provided outside the vehicle and the charger can charge the vehicle battery. That is, as shown in FIG. 11, a charge control unit 48 (for example, a relay circuit) which controls opening and closing of the charging circuit is disposed between the supply connector 2 and a supply power source 47. When the slide switch 42 is driven to the ON position (see FIGS. 3 and 6B) to turn the microswitch 44 to ON, the microswitch 44 transmits an output signal through the supply power source 47 to the charge control unit 48. Conduction is enabled from a charger power source 62 to a vehicle battery 4 only when the microswitch 44 is closed and the conduction of charging current is inhibited when the microswitch 44 is opened.

Further, a special connection-detecting means such as a photosensor and the like may be provided on a fitting portion of the coupling and detect the complete fitting position of the supply connector and vehicle inlet. The conduction of charging current is enabled so long as the connection-detecting signal and the pushing signal of the microswitch contact in the above embodiment are applied to the charger, thereby enhancing the reliability of the coupling.

What is claimed is:

1. A connector assembly for supplying electricity from a source to a receiver thereof through a coupling including an inlet on said receiver and a supply connector electrically connected to said source, said supply connector comprising:
a housing containing supply terminals adapted to be detachably coupled to receiving terminals on said receiver;
a movable member on said housing for displacement of said inlet and supply connector relative to each other between a partial grip position and a complete grip position; and
an enabling connector on said housing including a switch in a circuit effecting an electrical connection between said inlet and said supply connector only when said inlet and supply connector are in said complete grip position.

2. The connector assembly of claim 1 wherein said housing has a grip member pivotally mounted on said movable member and extending in a direction away from said inlet, whereby pivoting of said grip member pulls said supply connector toward said inlet from said partial grip position to said complete grip position.

3. The connector assembly of claim 2 wherein an enabling portion on said movable member is adapted to prevent said switch from closing said circuit when said movable member is in said partial grip position, said enabling portion adapted to permit said switch to close said circuit when said movable member is in said complete grip position.

4. The connector assembly of claim 1 wherein said source is a charger and said receiver is a vehicle battery.

5. The connector assembly of claim 1 wherein said circuit has a delay unit which permits conduction of said electricity only after a predetermined interval from movement of said movable member to said complete grip position.

6. The connector assembly of claim 2 wherein said grip member has a slidable lock member therein which elastically contacts said enabling connector and retains said movable member in said complete grip position.

7. The connector of claim 1 wherein said displacement is axial.

* * * * *